United States Patent
Garbarino

(10) Patent No.: US 8,631,833 B2
(45) Date of Patent: Jan. 21, 2014

(54) YOGA TOWEL

(75) Inventor: Gwendolyn Mary Garbarino, Evergreen, CO (US)

(73) Assignee: Silver Plume, LLC, Evergreen, CO (US)

( * ) Notice: Subject to any disclaimer, the term of this patent is extended or adjusted under 35 U.S.C. 154(b) by 26 days.

(21) Appl. No.: 13/331,592

(22) Filed: Dec. 20, 2011

(65) Prior Publication Data

US 2013/0153081 A1  Jun. 20, 2013

(51) Int. Cl.
*D03D 15/00* (2006.01)
*D03D 11/00* (2006.01)
*D03D 25/00* (2006.01)

(52) U.S. Cl.
USPC ........... 139/426 R; 139/383 R; 139/410; 139/420 R; 139/420 A

(58) Field of Classification Search
USPC .......... 139/383 R, 394, 396, 397, 398, 403, 139/405, 408–418, 420 R, 423, 426 R, 420 A
See application file for complete search history.

(56) References Cited

U.S. PATENT DOCUMENTS

| | | | |
|---|---|---|---|
| 3,616,134 A | | 10/1971 | Palenske |
| 3,668,050 A | * | 6/1972 | Donnelly ............ 128/849 |
| 4,147,828 A | | 4/1979 | Heckel et al. |
| 4,536,433 A | * | 8/1985 | Sagi et al. .......... 428/195.1 |
| 4,609,580 A | * | 9/1986 | Rockett et al. ....... 428/198 |
| 4,644,592 A | * | 2/1987 | Small ................... 4/583 |
| 4,781,962 A | * | 11/1988 | Zamarripa et al. ....... 428/138 |
| 4,822,669 A | * | 4/1989 | Roga ................. 442/373 |
| 4,850,991 A | * | 7/1989 | Nakanishi et al. ........ 604/387 |
| 5,173,346 A | * | 12/1992 | Middleton .............. 428/53 |
| 5,424,117 A | * | 6/1995 | Heiman et al. ......... 442/189 |
| 5,500,267 A | * | 3/1996 | Canning ................ 428/68 |
| 5,733,629 A | * | 3/1998 | Insley ................. 428/141 |
| 6,247,505 B1 | * | 6/2001 | Worman ............... 139/396 |
| 6,491,196 B1 | | 12/2002 | Coler |
| 6,668,868 B2 | * | 12/2003 | Howland et al. ....... 139/383 R |
| 6,911,407 B2 | * | 6/2005 | Sherrod et al. ......... 442/76 |
| 6,935,382 B2 | | 8/2005 | Buckley |
| 6,961,969 B2 | | 11/2005 | Nichols |
| 7,044,173 B2 | * | 5/2006 | Silver ................. 139/396 |
| 7,485,071 B2 | * | 2/2009 | Edwards ............... 482/23 |
| 7,850,498 B2 | * | 12/2010 | Yeh ................... 441/65 |
| 7,976,933 B2 | * | 7/2011 | Yeh ................... 428/159 |
| 8,220,087 B2 | * | 7/2012 | Villa et al. ............. 5/420 |
| 8,236,403 B2 | * | 8/2012 | Silver ................. 428/89 |
| 8,267,126 B2 | * | 9/2012 | Rabin et al. ........... 139/396 |
| 2002/0124904 A1 | * | 9/2002 | Howland et al. ....... 139/420 R |

(Continued)

OTHER PUBLICATIONS http://www.consumersearch.com/yoga-mats/mats-and-towels-for-hot-yoga, entitled "Yoga Mats: Full Report," Mar. 2011, © 2011, ConsumerSearch, Inc. A Service from About.com, a part of *The New York Times Company*.

*Primary Examiner* — Bobby Muromoto, Jr.
(74) *Attorney, Agent, or Firm* — D. Peter Hochberg; Sean F. Mellino; Richard A. Wolf

(57) ABSTRACT

A yoga towel comprising a first layer for standing poses made of woven nylon threads and fibers made from skin-polishing cloth, and an opposite second layer for sitting, kneeling and lying poses made of waffle-woven microfiber fabric. The yoga towel has an edge made of sailcloth. The yoga towel is constructed to prevent a participant from slipping during standing yoga poses, and the exterior remains dry to the touch during use.

10 Claims, 3 Drawing Sheets

(56) References Cited

U.S. PATENT DOCUMENTS

| | | | |
|---|---|---|---|
| 2004/0055659 A1* | 3/2004 | Silver | 139/396 |
| 2004/0175556 A1* | 9/2004 | Clark et al. | 428/298.4 |
| 2004/0224121 A1* | 11/2004 | Sheppard, Jr. | 428/92 |
| 2004/0229535 A1 | 11/2004 | Tang | |
| 2004/0250346 A1* | 12/2004 | Vasishth | 5/417 |
| 2005/0192158 A1 | 9/2005 | Edwards | |
| 2005/0223512 A1* | 10/2005 | Mangold et al. | 15/229.14 |
| 2005/0257322 A1* | 11/2005 | Remme et al. | 5/652 |
| 2009/0042468 A1* | 2/2009 | Suzuki et al. | 442/76 |
| 2009/0260707 A1* | 10/2009 | Aneja et al. | 139/420 R |
| 2009/0297811 A1 | 12/2009 | Hutchinson | |
| 2010/0143640 A1* | 6/2010 | Wilmsen | 428/85 |
| 2010/0143645 A1* | 6/2010 | Wilmsen | 428/116 |
| 2010/0209661 A1* | 8/2010 | Wilmsen | 428/116 |
| 2010/0297423 A1* | 11/2010 | Chapman et al. | 428/304.4 |
| 2011/0143083 A1* | 6/2011 | Scorgie | 428/95 |
| 2011/0189444 A1* | 8/2011 | Beers | 428/192 |
| 2012/0208416 A1* | 8/2012 | Lerman | 442/1 |
| 2012/0213962 A1* | 8/2012 | Scorgie | 428/92 |
| 2012/0255643 A1* | 10/2012 | Duan | 139/396 |

* cited by examiner

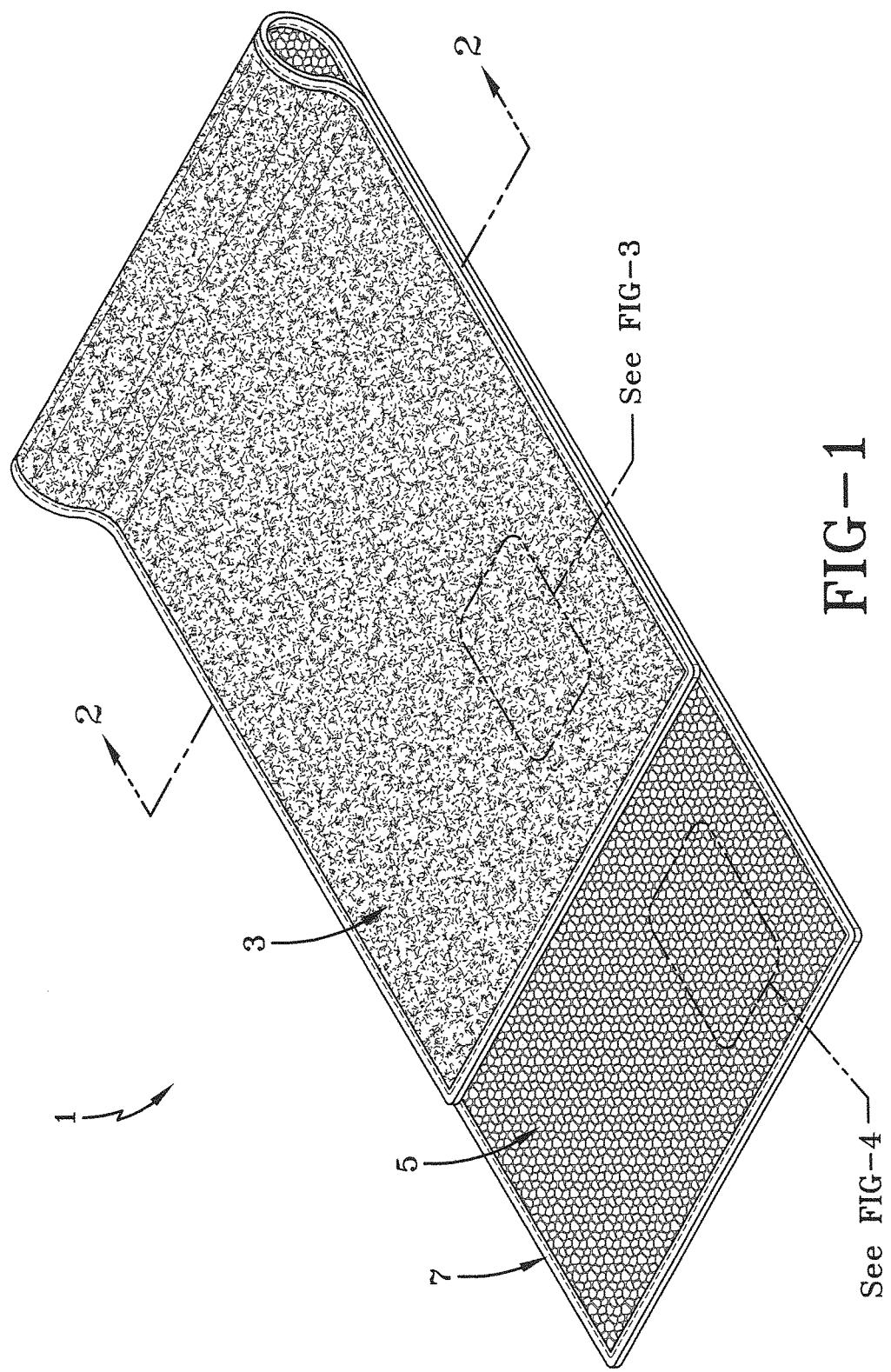

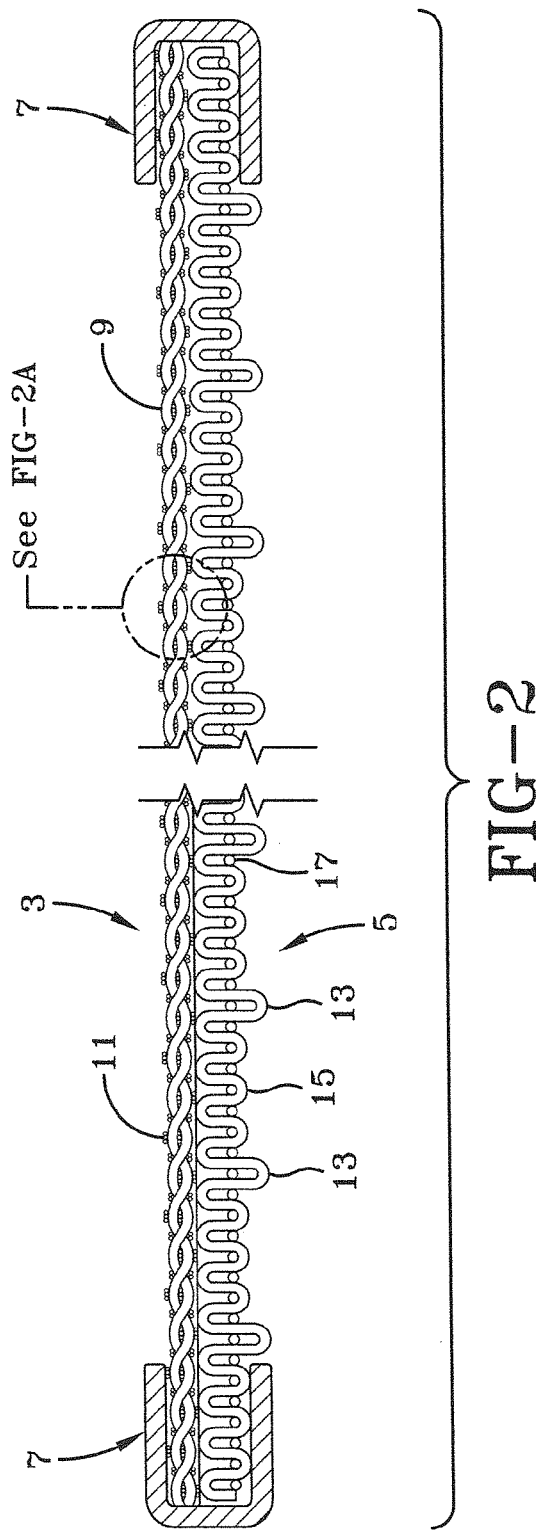
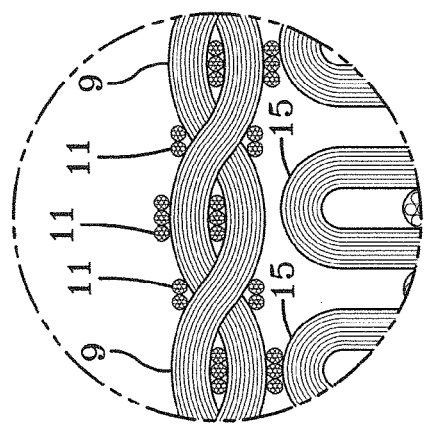

YOGA TOWEL

BACKGROUND OF THE INVENTION

1. Field of the Invention

This invention relates to yoga towels, and in particular to a yoga towel which is constructed to substantially prevent a yoga towel from sliding during yoga poses to substantially prevent the yoga participant from slipping during standing yoga poses, to keep the yoga mat and towel dry during yoga poses, and to cushion the yoga participant during poses since the poses are usually done on a hard surface.

2. Description of the Prior Art

The practice of yoga has become very popular over the years. Various types of yoga have been found to increase strength and flexibility, while putting the yoga practitioner's mind at ease while performing the yoga poses, postures or positions. There are numerous types of yoga practices. Yoga itself is directed to the combined effect of physical, mental and spiritual necessities of yoga practitioners. The yoga poses, and in particular Indian hatha yoga poses or asanas, include those directed to devotion and to knowledge. These poses vary from gentle (kundalini and viniyoga) to moderate (Iyengar and sivananda), to hot moderate (Bikram) to vigorous (astanga and vinyasa) poses. Since yoga sessions usually last from ½ to 2½ hours, a large amount of perspiration is typically generated. These poses are hereinafter referred to as yoga poses or yoga postures.

In Bikram yoga, there are basically standing yoga poses and sitting/lying poses. These respective poses include as standing poses:

Pranayama (standing breathing)
Ardha-Chandrasana (half moon pose with) with Pada-Hastasana (hands to feet pose)
Utkatasana (awkward pose)
Garudasana (eagle pose)
Dandayamana-Janushirasana (standing head to knee pose)
Dandayamana-Dhanururasana (standard bow pulling pose)
Tuladandasana (balancing stick pose)
Dandayamana-Bibhaktapada-Paschimotthanasana (standing separate leg stretching pose)
Trikanasana (triangle pose)
Dandayamana-Bibhaktapada-Janushirasana (standing separate leg head to knee pose)
Tadasana (tree pose)
Padangustasana (toe stand pose)

and as sitting/lying poses:

Savasana (dead body pose)
Pavanamuktasana (wind removing pose)
Sit-Up
Bhujangasana (cobra pose)
Salabhasana (locust pose)
Poorna-Salabhasana (full locust pose)
Dhanurasana (bow pose)
Supta-Vajrasana (fixed firm pose)
Ardha-Kurmasana (half tortoise pose)
Ustrasana (camel pose)
Sasangasana (rabbit pose)
Janushirasana (head to knee pose with) Paschimotthanasana (stretching pose)
Ardha-Matsyendrasana (spine twisting pose)
Kapalbhati in Vajrasana (blowing in firm pose)

A persistent problem with standing yoga is the tendency of the feet of yoga participants to slip. This slipping problem is largely the result of perspiration which has accumulated on the yoga mat and towel. There have been various efforts to solve this problem, but for one or more reasons they have been unsuccessful. An exercise rug, known as a mysore rug or an astanga rug, is placed on an exercise mat for absorbing perspiration. However, sufficient perspiration is not absorbed to make it effective. U.S. Pat. No. 6,935,382 (Buckley 2005) discloses an exercise rug with contours such as raised edges, indentations or dot patterns at opposite ends of the rug but not at its center, which are disposed in a moisture-absorbing woven fabric, which has a foam rubber portion. The latter rug has not been widely used. Another towel on the market is the Yogitoes® Skidless Premium Towel. U.S. Pat. Nos. 6,961,969, 7,069,607 and 7,137,157 are directed to the latter product. Yogitoes® is a towel having a base layer with projections in the form of silicone nubs on its underside to allegedly keep it from sliding, or bunching, during poses. The nubs can have a higher coefficient of friction than the base layer to assist in keeping the yoga towel in place. The base layer is made from a liquid absorbing material such as natural fibers or fabrics, like cotton, silk wool or hemp, and/or synthetic materials such as acrylics, polyester microfiber, nylon and/or rayon. The Yogitoes® on the market are not believed to be made of a microfiber. The projections can be made from latex, rubber, or epoxy. The latter product is in wide use, but it does have disadvantages. For one, although it does absorb some perspiration, not enough is absorbed so there is sliding of the towel when the user goes through poses as when in a yoga class. For another, Yogitoes® towels do slip until the towel becomes slightly damp.

Another yoga towel in use is the Padapath yoga towel which is made from hemp whose fibers increase traction. This yoga towel also suffers from the disadvantage of slipping when it is dry. It must be damp to prevent slipping. There is limited ability to sufficiently absorb perspiration. A yoga mat for use in hot yoga is the Barefoot Yoga Original Eco Yoga Mat which is made from jute and natural rubber. A disadvantage of the latter yoga mat is that it is difficult to clean because of its absorption of perspiration and grime. Another mat on the market is the Manduka eKO yoga mat which is a closed-cell natural rubber product. This mat decomposes over time and would have to be replaced. A Manduka eQua mat towel is on the market, and like other available mat towels has to be damp before it provides some level of traction. The Manduka eQua Hot Yoga towel is made from a double-knit microfiber which allegedly will keep the mat on which it sits dry, although it appears that there is no traction for feet on the towel. The Kulae towel is a microfiber towel. The Prana Sunja Skidless towel is a chamois towel which allegedly provides a slip-free surface once the user has heated up. The Gaiam Thirsty Yoga Towel is described as a super absorbent microfiber towel, but has been found to be too slippery for hot yoga because the hands and feet slip on the towel. The Arama microfiber towel has non-slip grippers on its underside.

Publication US 2004/0250346 (Vasishth 2004) discloses a multi-layer yoga mat having a fabric layer laminated to a foam layer and held in place by an adhesive. The fabric layer can have a tacky polymer for slip resistance. A second foam layer provides a cushioning effect. The fabric layer can be a double-layered knitted fabric made from polyester or cotton. It doesn't absorb moisture but only wicks it. The lack of absorption renders it always moist in use and further would take a long time to dry.

An anti-slide mat is disclosed in US Publication 2004/0229535 (Tang). This mat has a cloth layer composed of a woolly layer and a base layer, with an anti-slide paste which is coated or sprayed on the base layer. It is not believed to absorb moisture which is a major shortcoming.

U.S. Pat. No. 7,485,071 (Edwards 2009) describes a composite yoga mat and straps. It includes a fabric sheet with holes or loops as hand grips or appendage supports for use in yoga poses. The patent describes one embodiment with an embedded terrycloth sheet with a flexible form coating as a frictional material. The yoga mat described in the latter patent can absorb moisture, and one of the absorbent materials can be a microfiber. A similar invention is also the invention of Publication US 2005/0192158 (Edwards 2005) which describes a yoga mat which is also a combination of a frictional material and a moisture-absorbent material, although it lacks the straps described in the foregoing patent.

A single layer exercise mat which can be used, for example, in the practice of hatha yoga, is described in U.S. Pat. No. 6,935,382 (Buckley 2005). This patent is directed to a single-layer woven rug having contours for allegedly reducing the risk of slippage by the user, by serving as a grip for the user's hands and/or feet when the user has been perspiring. Although there is passing reference to "some moisture absorption," it is not apparent that the woven rug adequately absorbs the perspiration of a user.

Another exercise mat, as opposed to a towel, is the subject of Publication US 2009/0297811 (Hutchison 2009). One layer mats are disclosed. In one embodiment, a twisted and woven yarn or threads are attached together by lamination or stitching. Slip resistance is provided by a coating on the bottom surface by a flexible, tacky product such as liquid synthetic rubber. A second embodiment incorporates two detachable slip-resistant meshes or a rubber permanently applied to the mat. The third embodiment uses twisted and woven yarn and/or threads, with slip-resistant strands and a liquid latex rubber coating. There is limited moisture absorbency, wherefore this reference is directed to a mat.

Other exercise mats and a mat holder are also known. U.S. Pat. No. 6,491,196 (Coler 2000) is directed to a mat holder known as a "Sticky Mat" made of textured rubber with a sticky finish coating.

The foregoing mats collect pools of perspiration on their surface, there can be slippage on the pooled surface, and its absorption of unpleasant odors. U.S. Pat. No. 4,147,828 (Heckel et al. 1979) discloses a three-layer exercise and tumbling mat with soft elastic synthetic laminated foam layers with top textile layers and a non-skid mesh on the underside. Many yoga mats collect pools of perspiration on their surface, and there can be slippage on the pooled surface, in addition to the absorption of this moisture yielding unpleasant odors.

There are a number of known skin polishing cloth patents and patents directed to mats having non-slip properties which are not for use with yoga or other exercise. U.S. Pat. No. 5,500,267 (Canning 1996) describes a multi-layered, slip-resistant, and disposable mat having layers attached by an adhesive with a nylon screen or suitable mesh allowing oil and other liquids to permeate to an absorbent layer. The bottom layer resists leakage. A sorbent article having a sorbent layer and a texturized non-slip polymeric skin layer is described in U.S. Pat. No. 5,733,629 (Insley 1998). It has two plies including an anti-slip polymeric textured skin and a sorbent layer. A floor mat is discussed in U.S. Pat. No. 5,962,350 (Krotine 1999), made of a non-woven upper layer of synthetic material, a pair of intermediate layers, a liquid-impervious layer and a non-slip layer. It is used to be walked upon and it absorbs water from rain or snow. A disposable laminated bathmat with an absorbent central layer of creped cellulosic wadding and opposing faces of scrim-tissue laminate and plastic film is discussed in U.S. Pat. No. 3,616,134 (Palenske 1971). Another floor mat having liquid-absorbing matting composed of four layers, with a rigid and incompressible layer to support a person's feet and providing a traction surface for the feet, is the subject of U.S. Pat. No. 4,328,275 (Vargo 1982).

U.S. Pat. No. 4,684,562 (Hartkemeyer 1987) relates to a mat for catching drippings, and includes three sheets bonded together, having a top sheet which is absorbent, made of an isotropically permeable material, an intermediate liquid-absorbent material, and a third layer that is resistant to liquid. In U.S. Pat. No. 6,579,816 (Lockett 2009), a cut-resistant and shred-resistant absorbent sheet is described. The sheet comprises a mesh of absorbing fibers containing a polymer layer formed by discontinuous heat-bonded particles. The absorbent and shred-and-cut-resistant layer is attached to a base layer. In U.S. Pat. No. 6,774,067 (Demott et al. 2004), a mat is disclosed having a fabric layer and a rubber backing bonded to the fabric layer. The fabric layer includes a microknitted plush polyester fabric which is chemically treated to render it hydrophilic. The latter layer can have a textured surface. A petroleum-resistant mat is described in U.S. Pat. No. 6,899,940 (Leriget 2005). The mat has a bottom panel with a raised perimeter forming a recess. There is a recyclable, washable and reusable material such as a polypropylene absorbent pad. The mat may be formed from recycled tires. The mat has four layers, and the absorbent pad is separated from a mesh layer by a backflow prevention member.

In U.S. Pat. No. 6,911,407 (Sherrod 2005), an absorbent article having a vapor-permeable and liquid-impermeable bottom sheet is described. There is an interior surface and an exterior surface, an absorbent structure positioned adjacent the interior surface, and a non-adhesive, skid-resistant coating is applied to the exterior surface to render the bottom sheet vapor-permeable. The product has various layers including a top sheet, an absorbent structure, a bottom sheet, a non-adhesive skid-resistant coating and an adhesive. Referring next to U.S. Pat. No. 6,926,862 (Fontenot et al. 2005), this patent is directed to a container liner, a shelf liner or a drawer liner that absorbs liquids spilled or leaked. It has both a liquid-impervious layer and a liquid-absorbent layer, the latter also controlling odors. In U.S. Pat. No. 7,067,184 (Carkeek 2006), a composite mat having a non-slip backing layer, a top liquid-absorbing textile layer and an intermediate stabilization is disclosed. The intermediate layer is a spun-bonded polyester non-woven primary fabric layer. A disposable cutting sheet for food items is disclosed in U.S. Pat. No. 7,208,216 (Ackerman 2007). It has an absorbent ply and a thermoplastic ply with a number of apertures. The cutting sheet also has a second liquid-impervious layer with an absorbent ply and a thermoplastic ply with the former ply being disposed below and secured to the absorbent ply of the first layer. In Publication US 2006/0093788 (Behm et al. 2006), a disposable liquid-absorbent mat is described having a liquid-absorbent layer and a liquid impervious layer. The layers can be combined in a single ply or may constitute separate plies that are laminated together either alone or in combination with other plies. Drying mats are disclosed in each of Publications US 2010/0209661 (Wilmsen 2010), US 2010/0143640 (Wilmsen 2010) and US 2010/0143645 (Wilmsen 2010). The first describes a drying mat including layers of a microfiber material and a foam layer. The second is directed to a similar drying mat having a pair of microfiber layers joined together by an adhesive and to a foam layer. In one embodiment, both of the microfiber layers have a honeycomb pattern. In the third of these publications, a drying mat is disclosed having a pair of microfiber layers joined to a foam layer by an adhesive where the microfiber layers can have a honeycomb pattern.

SUMMARY OF THE INVENTION

It is an object of the present invention to provide an improved yoga towel that is highly absorbent of perspiration of users of the towel while providing traction to the hands and feet of a user of the towel during yoga poses.

Another object of the invention is to provide an improved yoga towel which is machine washable and machine dryable.

It is an object of the invention to provide an improved yoga towel which dries quickly following washing.

A still further object of the present invention is to provide an improved yoga towel which is long lasting while maintaining its useful features.

A still further object of the invention is the provision of an improved yoga towel which can be made from readily available materials using known manufacturing techniques.

An additional object of the invention is the provision of a yoga towel for being placed on a standard yoga mat made from rubber or plastic, which has one side up during standing poses for preventing the feet from slipping whether the towel is wet or dry and the other side up for poses involving sitting, kneeling, lying face down and lying on one's back.

Another object of the present invention is to provide an improved yoga towel that can be used with either side up during different poses and yet being highly moisture absorbent in both cases.

It is also an object of the invention to provide a yoga towel which does not absorb perspiration and yield unpleasant odors.

A general object of the present invention is to provide an improved yoga towel which is efficient and effective in use, and economical with respect to its component parts and manufacturing processes.

The foregoing objects of the invention are obtained according to the preferred embodiment of the invention by a yoga towel composed of a first side for standing poses where the towel provides traction for the feet and a second side for sitting, kneeling or lying down. The first side is composed of woven nylon used as a skin polishing cloth made of twisted, wavy nylon threads going in one direction and very thin strands going in the other direction perpendicular to the one direction. The other side is a waffle-weave microfiber which is unwoven. There is a border fabric which is an edging for the yoga towel, and it is made from a nylon sheet as used for sailing material.

BRIEF DESCRIPTION OF THE DRAWINGS

FIG. 1 is a perspective view of the yoga towel according to the preferred embodiment of the invention.

FIG. 2 is an enlarged, cross-sectional view taken in the direction 2-2 of the view shown in FIG. 1.

FIG. 2A is an enlarged detail of the portions shown in FIG. 2.

DETAILED DESCRIPTION OF THE PREFERRED EMBODIMENT

Figure 3:
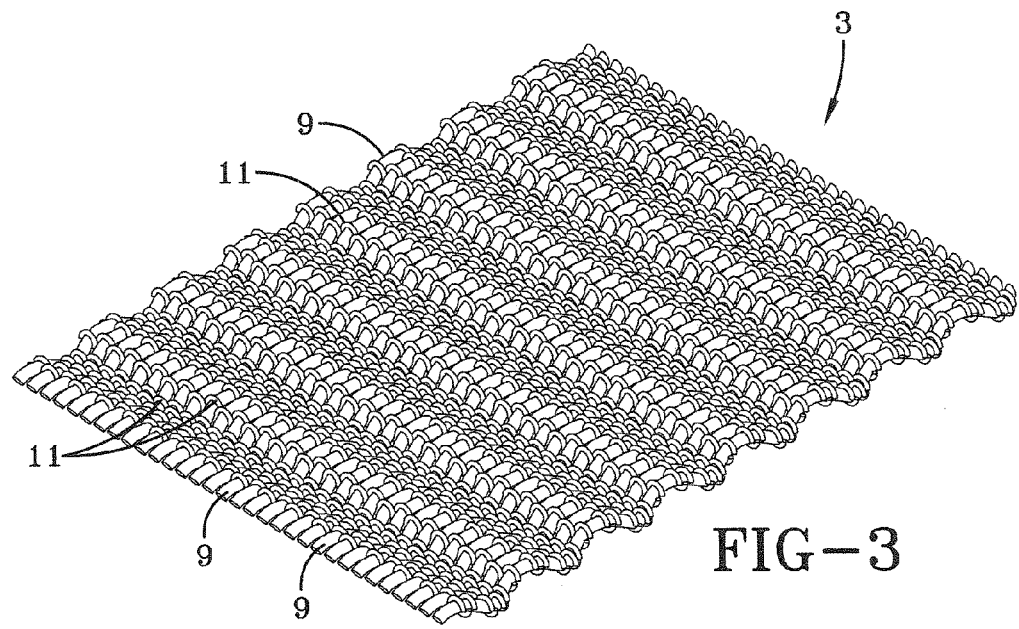
FIG. 3 is a perspective view of the portions identified in FIG. 1.

Referring to FIG. 1, a yoga towel 1 according to the preferred embodiment is shown. Yoga towel 1 has a woven first side or layer 3 made from skin-polishing towels, a waffle-weave microfiber second side or layer 5, and a nylon edging 7 made from sailcloth. A yoga practitioner would stand on woven first side 1 and practice the sitting, kneeling and lying poses on the microfiber second side 5.

Referring next to FIG. 2, first layer 3 is composed of rows of twisted nylon threads 9 which are woven with thin strands 11 of nylon fibers. This is shown more clearly in FIG. 2A. First layer 3 is a skin-polishing cloth or towel. First layer 3 is 100% nylon and is 1.09 to 1.62 grams per cubic meter. It has an abrasive feel, and thus provides good traction to people standing on first layer 3. Since any perspiration passes through openings in the nylon first layer 3 and absorbed by microfiber second layer 5, excellent traction occurs whether first layer 3 is wet or dry. FIG. 3 shows first layer 3 in perspective form. Twisted nylon threads 9 are thick, as shown, and are woven with nylon fibers 11 in alternating groups of two or three fibers.

Skin-polishing towels are readily available. The fabric is mostly made in China, Korea and Taiwan. Skin-polishing towels can be purchased, for example, in T.J. Maxx stores or in a Colorado chain store called Vitamin Cottage Natural Grocers. Skin-polishing towels are available under a variety of names such as "Paris Presents," "Aquasentials," and "Bass Body Care." Of course, one would buy the material in bolt form for the commercial manufacturing of yoga towels 1.

Figure 4:
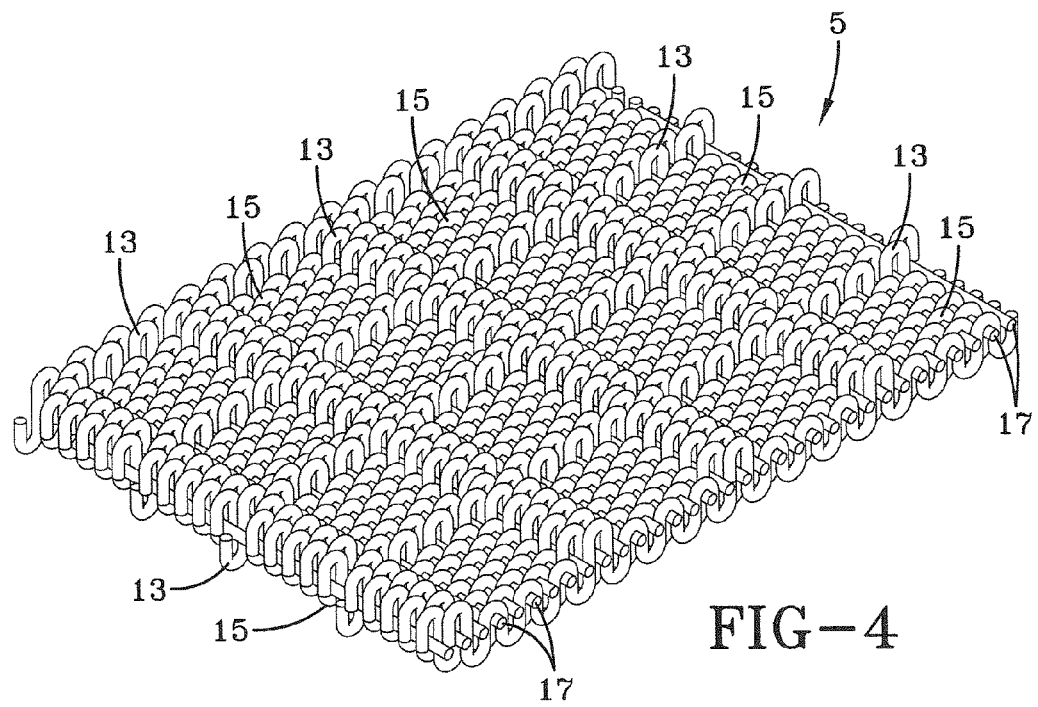
FIG. 4 is a perspective view of the portion identified in FIG. 1.

Second layer 5 is shown in FIG. 4 and is a waffle-weave microfiber fabric. Microfibers measure less than one denier, and in the preferred embodiment, are 0.5 denier. There are approximately 120,000 microfibers per square inch, and in the preferred embodiment are 80% polyester and 20% polyamide. Microfibers were invented in the 1950's. Microfiber is useful for athletic clothing since it wicks perspiration away from the body, keeping the wearer cool and dry. Microfiber is usually constructed from split conjugated fibers of polyester and polyamide. Microfiber cloth is exceptionally soft and holds its shape. It usually holds eight to ten times its weight in water.

Microfiber second layer 5 is provided in waffle-weave form, having raised portions 13 and recessed portions 15. The microfibers are woven through a base material or parallel strands 17. The waffle weave both enhances the already high absorption rate and prevents whatever slipping might occur. Although microfiber fabrics originally come from Japan, they are readily available from China.

Microfiber second layer 5 forms a waffle shape as shown in FIG. 4 having four rows of microfibers forming recessed portions having respectively a square pattern separated from adjacent square patterns by a single row of raised portions 13 of microfiber. Preferably the squares have sides of 0.25 inches in length.

Edging 7 is stitched to first layer 3 and second layer 5. Edging 7 binds layers 3 and 5 together to form a neat, attractive product. Yoga towel 1 can be made in any size. Standard yoga mats range in size from 64.5 inches to 68 inches in length and 23.5 inches to 24 inches in width. Yoga towel 1 should generally be about the same size as the yoga mat on which it would be placed. Yoga towel 1 is machine washable, preferably using a gentle cycle. Yoga towel 1 can be hung to dry or dried in a clothes dryer, preferably on a delicate cycle. Yoga towels 1 have been found to wear very well and last a long time even after considerable machine washing and machine drying. Yoga towels 1 do not yield unpleasant odors after use.

Yoga towels 1 are preferably made from single lengths of skin-polishing cloth and waffle-woven fabric. However, each or both sides could be made from smaller segments of material, such as on the order of quilts.

The invention has been described in detail with particular emphasis on the preferred embodiment, but variations and modifications may occur to those skilled in the art from the foregoing description and from the appended claims.

I claim:

1. A yoga towel comprising:
   a first layer on one side of said yoga towel composed of a woven layer having threads in one direction and abrasive fibers woven in a second direction perpendicular to the one direction for providing traction to persons standing on said first layer during yoga poses in the standing position, said first layer being devoid of microfibers; and
   a second layer on the opposite side of said yoga towel from said first layer, said second layer being composed of microfibers for absorbing perspiration of users of said yoga towel, to provide a comfortable surface to persons doing yoga poses involving sitting, kneeling, lying face down or laying face up, said second layer being joined to said first layer;
   said yoga towel being devoid of a foam layer;
   wherein perspiration emanating from a user in a standing position on said first layer flows through said first layer and is absorbed by said microfibers in said second layer, and perspiration emanating from a user on said second layer is absorbed by said microfibers in said second layer.

2. A yoga towel according to claim 1 wherein said first layer and said second layer have opposing bordering edges, and wherein said yoga layer further comprises an edging joining said opposing bordering edges to join said first and second layers.

3. A yoga towel according to claim 1 wherein said first layer is composed of a cloth for polishing skin.

4. A yoga towel according to claim 3 wherein said cloth for polishing skin is composed of rows of parallel twisted nylon threads going in one direction, with rows of parallel thin nylon fibers going in a second direction perpendicular to said one direction.

5. A yoga towel according to claim 4 wherein first layer has a density of 1.09 to 1.62 grams per cubic meter.

6. A yoga towel according to claim 1 wherein said second layer is composed of a waffle-weave microfiber fabric.

7. A yoga towel according to claim 1 wherein said microfibers are 0.5 denier.

8. A yoga towel according to claim 1 wherein there are approximately 120,000 microfibers per square inch in said second layer.

9. A yoga towel according to claim 1 wherein said microfibers are made of 80% polyester and 20% polyamide.

10. A yoga towel according to claim 1 wherein said threads in one direction in said woven layer are composed of twisted nylon fibers, and said abrasive fibers woven in the second direction are composed of nylon fibers.

* * * * *